(12) United States Patent
Daoud

(10) Patent No.: US 6,350,955 B1
(45) Date of Patent: Feb. 26, 2002

(54) STRAIN RELIEF

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/500,720

(22) Filed: Feb. 9, 2000

(51) Int. Cl.7 .................................................. H02G 3/18
(52) U.S. Cl. ............................... 174/65 R; 174/65 SS; 285/161; 285/322
(58) Field of Search .......................... 174/65 SS, 65 R, 174/74 A, 84 C, 93, 154; 285/161, 256, 257, 319, 322, 323, 331; 403/326, 329

(56) References Cited

U.S. PATENT DOCUMENTS

| 4,145,075 | A | * | 3/1979 | Holzmann | 285/81 |
| 4,250,348 | A | * | 2/1981 | Kitagawa | 174/65 SS |
| 4,358,079 | A | * | 11/1982 | Navarro | 248/56 |
| 4,375,011 | A | * | 2/1983 | Grunau | 174/65 SS |
| 4,600,803 | A | * | 7/1986 | Holzmann | 174/65 SS |
| 4,739,126 | A | * | 4/1988 | Gutter et al. | 174/65 SS |
| 4,767,135 | A | * | 8/1988 | Holzmann | 285/27 |
| 4,787,657 | A | * | 11/1988 | Henniger | 285/323 |
| 5,048,872 | A | * | 9/1991 | Gering | 285/92 |
| 5,679,926 | A | * | 10/1997 | Maloney et al. | 174/65 R |
| 5,927,892 | A | * | 7/1999 | Teh-Tsung | 403/259 |
| 6,160,221 | A | * | 12/2000 | Hablutzel | 174/88 C |
| 6,162,995 | A | * | 12/2000 | Bachle et al. | 174/151 |
| 6,284,973 | B1 | * | 9/2001 | Daoud | 174/65 R |

* cited by examiner

Primary Examiner—Dean A. Reichard
Assistant Examiner—Adolfo Nino
(74) Attorney, Agent, or Firm—Stroock & Stroock & Lavan LLP

(57) ABSTRACT

A new device and method for providing strain relief to soft-jacketed cables includes a base with a mounting portion and a tubular extension having a plurality of deflectable arms, each of which are provided with a pad. Upon tightening of a nut having a tapered inner channel, the deflectable arms and pads radially converge about the cable. The pads evenly spread the gripping forces created by the convergence of the deflectable arms, thereby preventing damage to the wires within the soft-jacketed cable.

17 Claims, 6 Drawing Sheets

STRAIN RELIEF

FIELD OF THE INVENTION

This invention relates to a device for providing strain relief to cables and, in particular, to a strain relief device for securing soft-jacketed cables of variable diameters carrying wires to telephone junction boxes for distribution to telephone equipment.

BACKGROUND OF THE INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs enter the building as part of a multi-conductor cable, the individual tip ring wire pairs must first be broken out from the cable into individual wire pairs. This is normally accomplished in a junction box known as, for example, a building entrance protector (BEP), or network interface unit (NIU).

The multi-conductor cables are generally enclosed in stiff insulation jackets having variable diameters depending upon the particular application. Because these multi-conductor cables carry the tip ring wire pairs that will be connected to various types of telephone equipment, it is necessary to provide strain relief to the cable to insure that the tip ring wire pairs do not become disconnected or loose. Loose or disconnected wires in a junction box can cause serious malfunctions in telephone, computer, or network service requiring costly repair and maintenance service. In some instances, the cable is jacketed with a soft, malleable material, which can get crushed or pinched by a device utilized to provide strain relief. Thus, it is desirable to have a strain relief device capable of securing jacketed cables of varying diameters without causing the wires carried within to become pinched or crushed.

Presently, however, there is no efficient means for providing strain relief to soft-jacketed multi-conductor cables of variable diameters or shapes in a way designed to eliminate pinching in soft-jacketed cables. Thus, there is a need for a device capable of securing multi-conductor cables of variable diameters and eliminating pinches.

SUMMARY OF THE INVENTION

The present invention is directed at overcoming shortcomings in the prior art. The present invention comprises a base having a tubular extension with a compressible portion. A nut is mountable over the tubular extension and has an inner channel provided with a tapered region for constricting the compressible portion of the tubular extension.

The operation of mounting the nut over the tubular extension causes the tapered region of the nut to exert a compression force on the compressible portion, which deflects the compressible portion inward. In a preferred embodiment, the compressible portion is comprised of a plurality of deflectable arms having gripping pads mounted to the ends of each arm. Under a compression force, the gripping pads radially converge and secure the cable without pinching the wires within. Because the compressible portion can be gradually compressed by the nut to a desired compression, a range of variable diameter cables can be secured by the present invention. Thus, the need to use cable fastening devices constructed for specific cable diameters is eliminated, thereby improving efficiency and reliability in cable connections.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the figures, which are not to scale, and which are merely illustrative, and wherein like reference numerals depict like elements throughout several views.

DETAILED DESCRIPTION OF THE PREFERRED EMBODIMENTS

Figure 1:
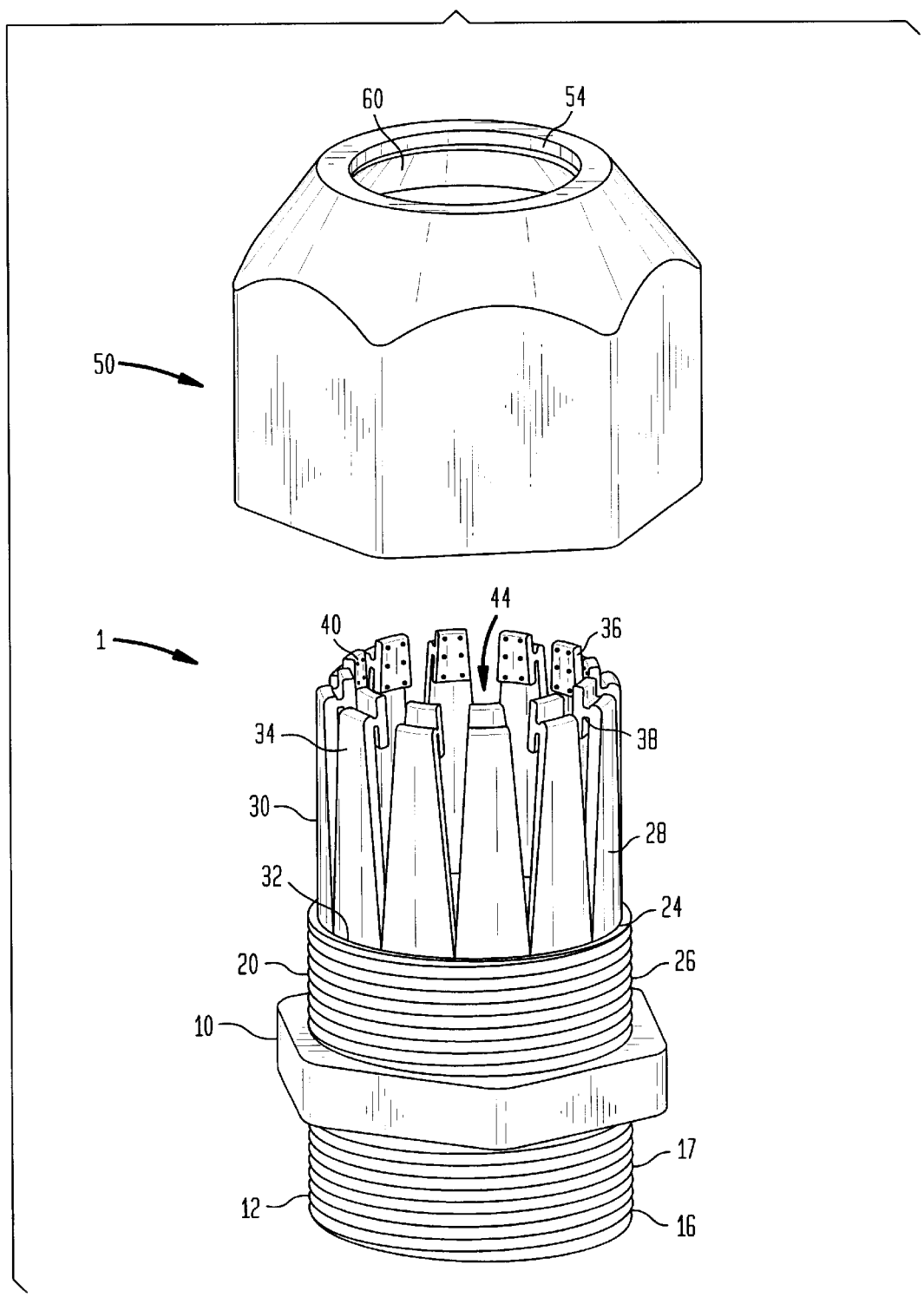
FIG. 1 is a side view of a strain relief device in accordance with the present invention.

Referring to FIGS. 1 to 5, there is shown a strain relief device 1 constructed in accordance with the present invention. Strain relief device 1 comprises a base 10 mountable to a fixed object and constructed to receiving therein a cable, not shown, of the type generally used in connection with telephone wiring or computer networking. Strain relief device 1 further comprises a tubular extension 20 that extends longitudinally from base 10. Tubular extension 20 preferably has a male screw thread 26 on outer surface 24 and a compressible portion 28, described further below, for grippingly securing a cable.

Nut 50, which is constructed to cause compressible portion 28 to grip cable, has a female screw thread 58 formed on at least part of inner channel 56 located nearest first end 52. Female screw thread 58 is constructed to threadingly engage male screw thread 26 of tubular extension 20. Inner channel 56 is further provided with a tapered region 60 sloping inwardly towards second end 54. One skilled in the art will recognize that the present invention is capable of being utilized in any number of applications, such as, by way of non-limiting example, securing soft-jacketed multi-conductor cables in BEPs and NIUs.

With reference to FIG. 1, base 10 is constructed to mount to a fixed object, such as a BEP or NIU. Base 10, as depicted in FIG. 1, preferably has a hexagonal shape to facilitate screwing base 10 into a structure, as described further below.

Figure 6:
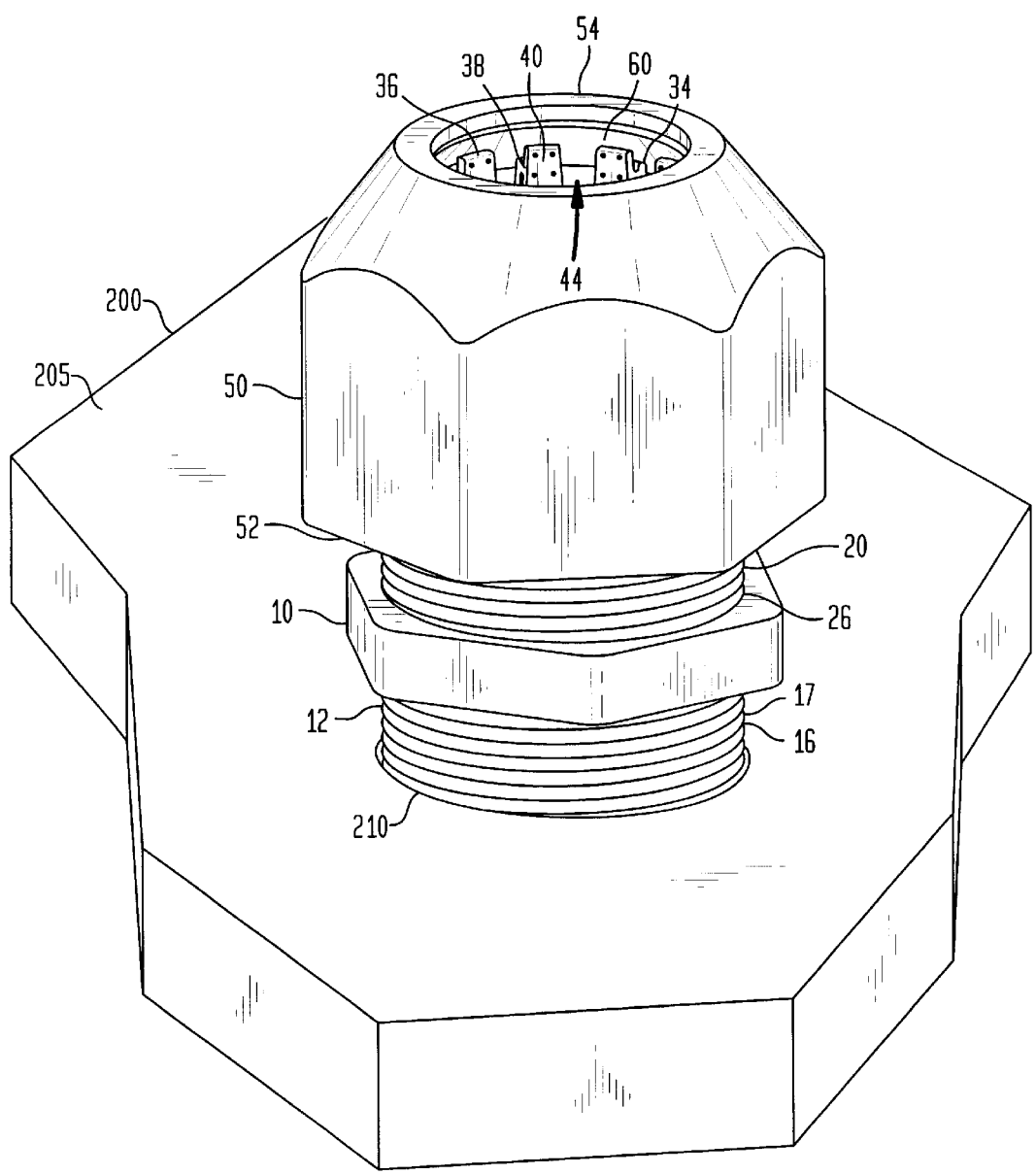
FIG. 6 is a side view of a first embodiment of the device of FIG. 1 mounted to a wall.

In a first embodiment, as shown in FIG. 6, base 10 is provided with mounting portion 12 having a threaded portion 16 on an outer surface 17 for engaging the threaded portion (not shown) of an aperture 210 formed in a wall 205 of a BEP or NIU 200, such that the tip ring wires carried within the cable can be distributed throughout the BEP or NIU 200 or other structure. In use, a wrench or other tool is used on the hexagonal base 10 to tighten mounting portion 12 onto structure 200.

Figure 3:
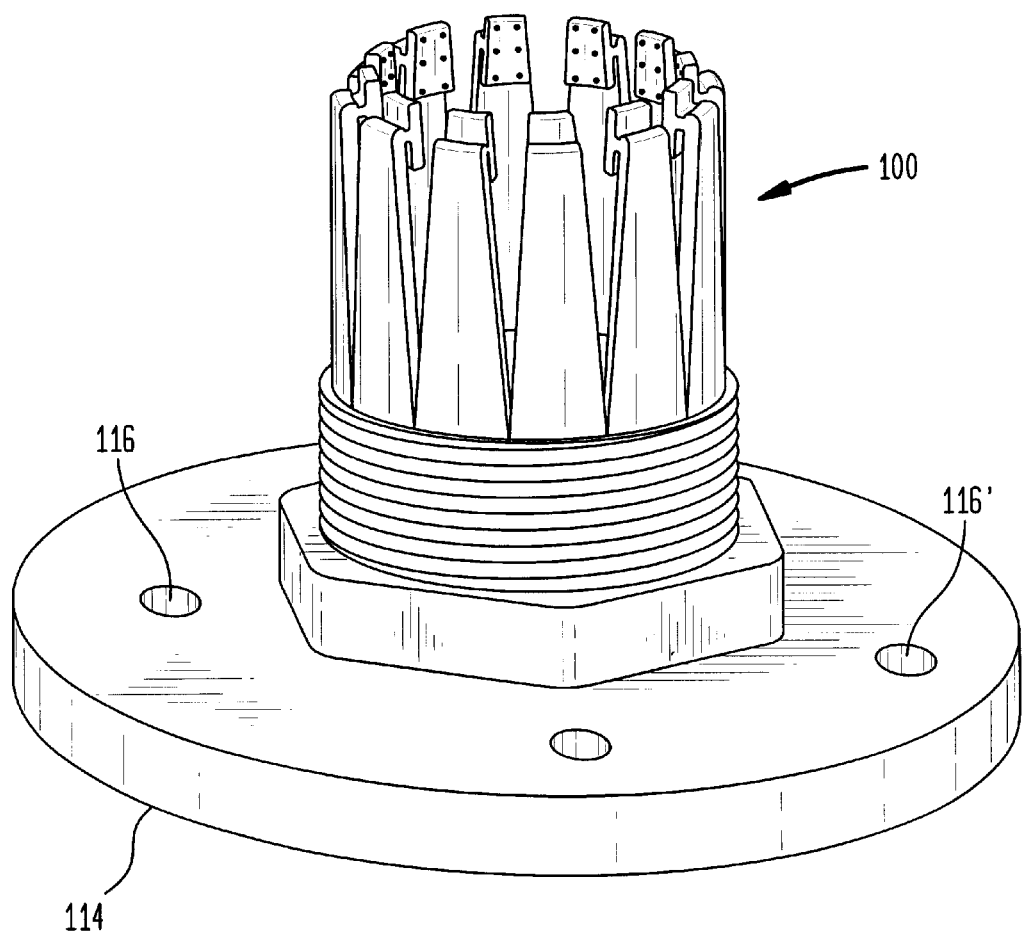
FIG. 3 is a side view of a second embodiment of the device of FIG. 1.

Referring to FIG. 3, in a second embodiment, base 100 has a mounting portion 114 which is preferably disc-shaped, although one skilled in the art will recognize that the shape used is a matter of design choice and that any shape may be substituted. As depicted in FIG. 3, mounting portion 114 is provided with a plurality of mounting apertures 116, 116'. In use, a nail or screw, or any other type of fastening article commonly used to mount an object, can be driven through mounting apertures 116 to mount base 100 to a fixed object. One skilled in the art will recognize that mounting apertures are not necessary and that mounting portion 114 can be mounted in any manner known in the art, including, adhesives, welding, and the like.

Further, one skilled in the art will recognize, that base 10 can be mounted to a structure in any manner known in the art, including but not limited to, snap-fitting, friction fitting, adhering, or integrally forming strain relief device 1 with the BEP or NIU or other structure.

With reference again to FIG. 1, base 10 is provided with tubular extension 20, which longitudinally extends from base 10. Tubular extension 20 preferably has a male screw thread 26 on outer surface 24. Male screw thread 26 is constructed to matingly engage internal female screw thread 58 of nut 50, as discussed further below.

One skilled in the art will recognize, however, that mounting nut 50 over tubular extension 20 via the mating engagement of threaded regions is but one manner in which the mounting may be accomplished. Nut 50 may, by way of non-limiting example, be snap fit, friction fit, or fit in any other way to achieve the compression of tubular extension 20 and the securement of nut 50 over tubular extension 20.

Tubular extension 20 preferably is formed of a durable, flexible material, such as plastic. Tubular extension 20 is provided with compressible portion 28 for securing a cable. In a preferred embodiment, compressible portion 28 comprises a plurality of deflectable arms 30 which define the compressible portion. Each arm 30 is tapered such that each arm 30 is wider at base 32 and thinner at gripping end 34. The taper results in ends 34 being freely spaced. Because ends 34 are freely spaced, ends 34 can be deflected inward causing ends 34 to radially converge until arms 30 meet.

Further, as depicted in FIG. 1, ends 34 of deflectable arms 30 are each provided with a movable gripping pad 36 for securing a cable and, if necessary, a soft-jacketed cable without pinching the wires in the cable. Movable gripping pads 36 are preferably shaped as quadrilaterals that mirror the taper of deflectable arms 30, such that no portion of any gripping pad 36 is wider than its respective arm 30. Thus, as arms 30 are deflected inward, gripping pads 36 do not interfere with the inward deflection, as ends 34 converge. However, one skilled in the art will recognize that movable gripping pads 36 may be, for example, made rectangular, circular, or in any other shape that eliminates the pinching effects to soft-jacketed cables.

In a preferred embodiment, movable gripping pads 36 are pivotably mounted to ends 34 via pivot 38. Pivot 38 is a thin portion of flexible material, such as, for example, a soft plastic. One will recognize, however, that gripping pads 36 may be movably mounted to ends 34 of arms 30 in any other way known in the art. Preferably, pivot 38 is connected to a substantially central portion of gripping pad 36. In use, pivot 38 enables gripping pads 36 to form fit around a cable, thereby equalizing the gripping forces created by strain relief device 1. As such, movable gripping pads 36 eliminate high stress areas, thereby reducing the instances of wire pinches and more evenly securing the cable.

Referring again to FIG. 1, inner surfaces 40 of gripping pads 36 collectively define channel 44 in which a cable is secured. Inner surfaces 40 are preferably formed with non-flat surfaces (not shown) for improving the gripping effect of gripping pads 36. Moreover, inner surfaces 40 are preferably layered with a soft material (not shown) having a high friction coefficient. Layering inner surfaces 40 in such a manner decreases stress areas while increasing the gripping effect of gripping pads 36.

Figure 2:
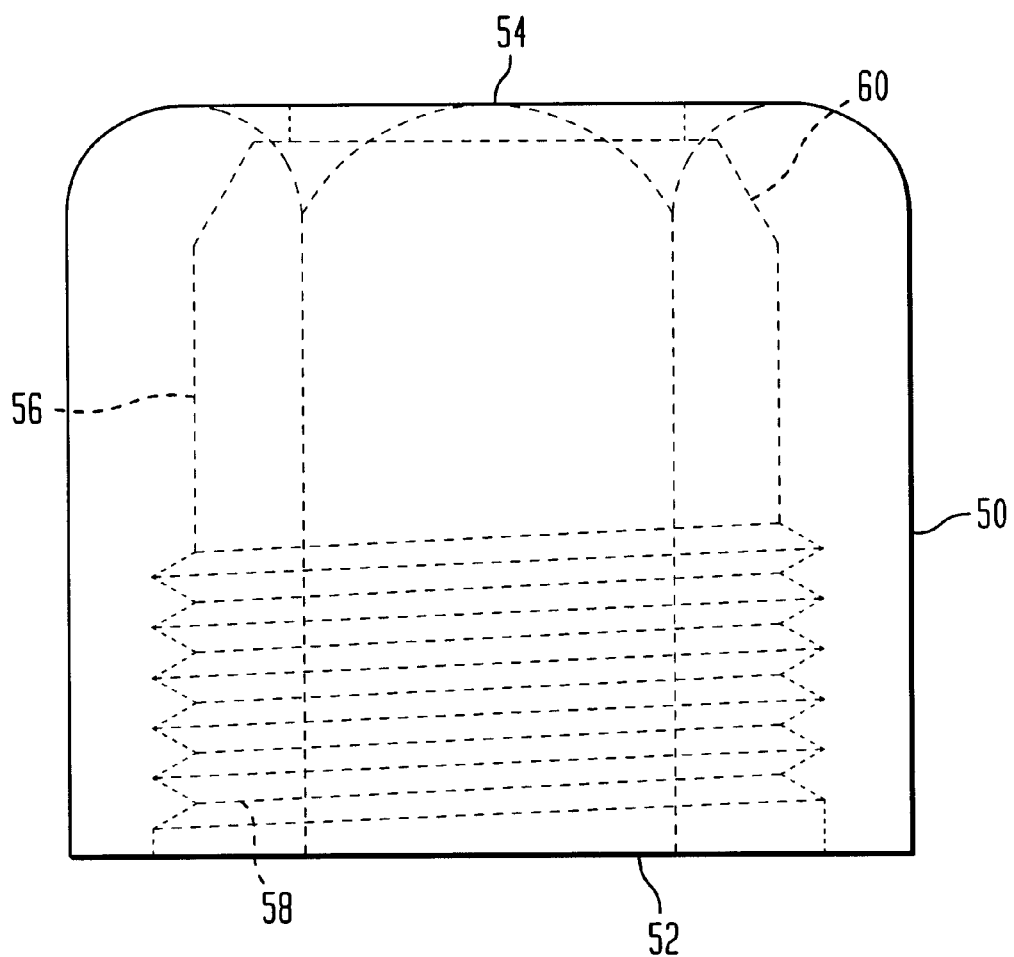
FIG. 2 is a side view of the nut of the device in FIG. 1.

With reference now to FIG. 2, there is shown a preferred embodiment of nut 50 for use with the present invention. Nut 50 is preferably a hexagonal nut, although any type of nut generally known in the art may be utilized. Nut 50 preferably has a generally cylindrically shaped inner channel 56 provided with an internal female screw thread 58 nearest to first end 52 for connection to the corresponding male screw thread 26 of tubular extension 20. As stated above, nut 50 may be fit over tubular extension 20 in any manner that achieves compression and securement. Inner channel 56 has a tapered region 60 nearest to second end 54 and adjacent to female screw thread 58. Tapered region 60 slopes inwardly towards second end 54. The particular angle used is a matter of design choice and is subject to the specific application for which the present invention is utilized.

Figure 4:
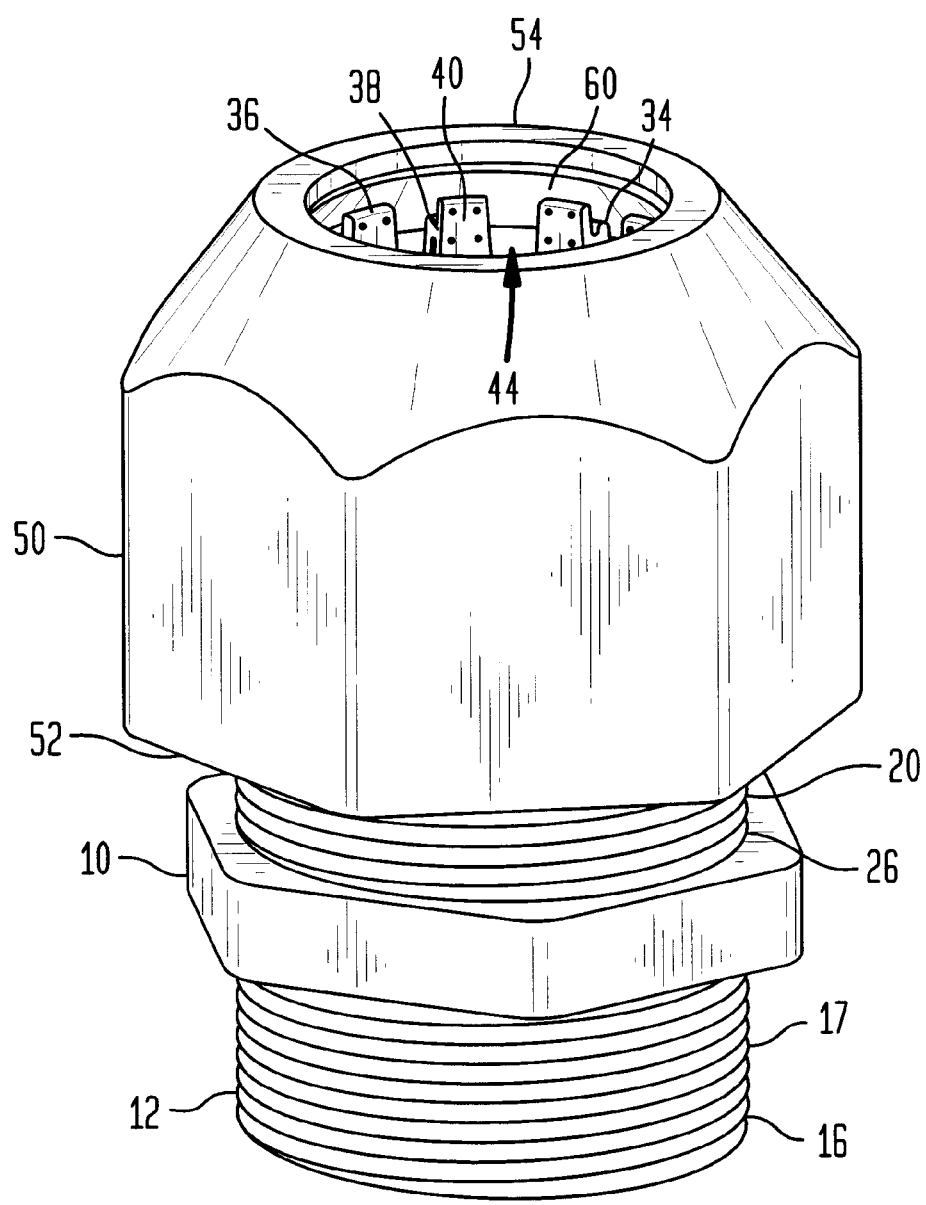
FIG. 4 is a side view of the device in FIG. 1, wherein the compressible portion is uncompressed.
Figure 5:
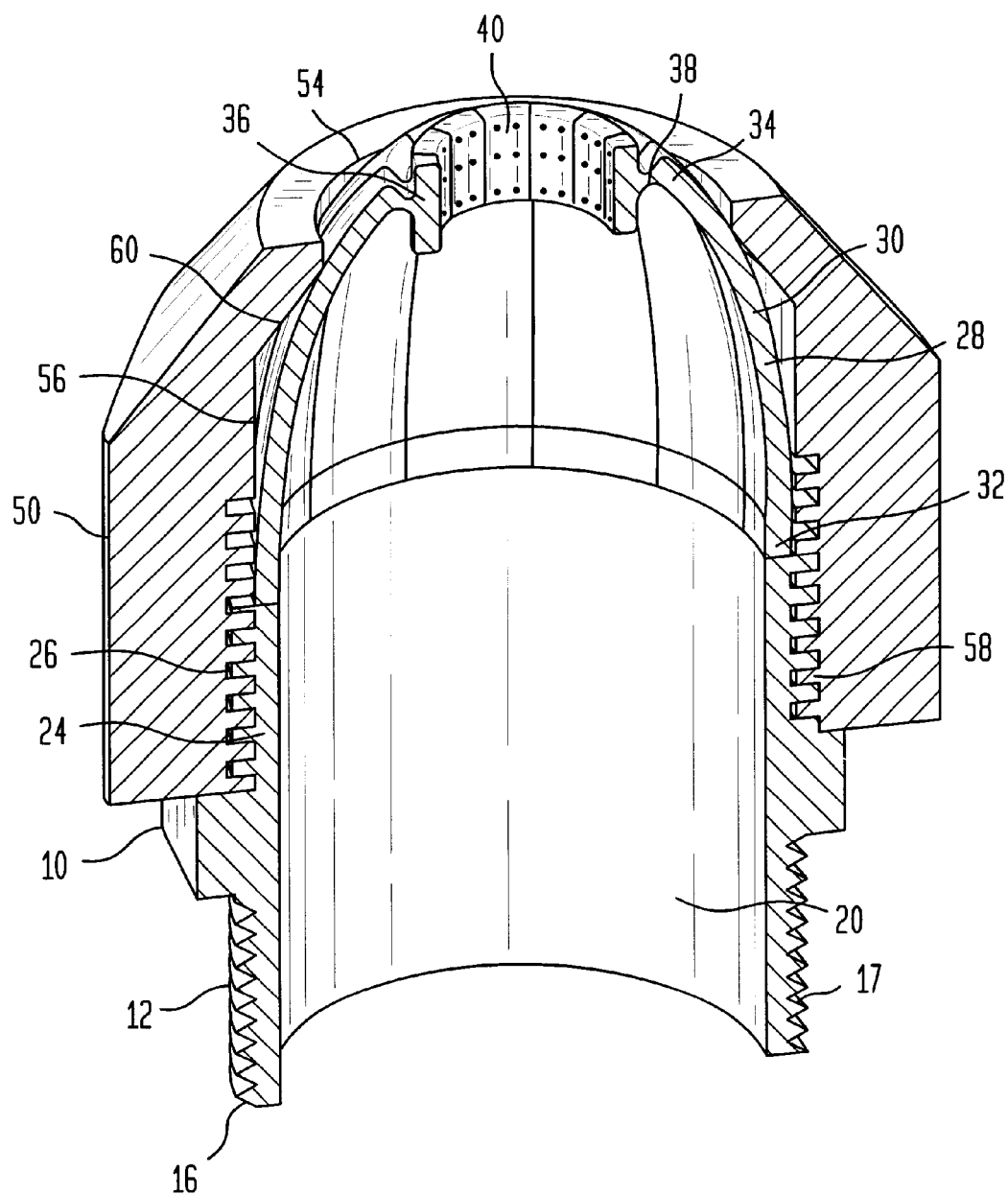
FIG. 5 is a cross-sectional view of the device in FIG. 1, wherein the compressible portion is in a fully compressed state.

Referring now to FIGS. 4 and 5, there is shown nut 50 mounted onto tubular extension 20 through the mating engagement of female screw thread 58 of nut 30 with male screw thread 26 of tubular extension 20. As depicted in FIG. 4, nut 50 is in a first position wherein the plurality of deflectable arms 30 of compressible portion 28 is in an uncompressed state. In an uncompressed state, channel 44, which is defined by inner surfaces 40 of movable gripping pads 36, is at its maximum diameter. In this state, a cable may be slid into and through channel 44 although it is not necessary for channel 44 to be at maximum diameter for a cable to be fed into channel 44. As second nut 50 is tightened, tapered region 60 contacts deflectable arms 30 forcing ends 34 and, therefore, gripping pads 36 to converge radially inward. This inward constriction results in the gradual decrease in the diameter of channel 44. With further reference to FIG. 5, when second nut 50 is fully tightened, deflectable arms 30 of compressible portion 28 are fully constricted and the diameter of channel 44 is at a minimum. The gradual convergence of gripping ends 34 and the reduction in diameter of channel 44 causes gripping pads 36 to make gripping contact with the inserted cable.

Because the tightening of nut 50 causes compressible portion 28 to gradually compress until reaching a fully compressed state, a multitude of cable diameters can be secured by strain relief device 1. The diameters of cables used with the present invention can range from the maximum diameter of channel 44 in an uncompressed state to the minimum diameter of channel 44 in a fully compressed state. One skilled in the art will recognize, however, that the respective compressed and uncompressed diameters of channel 44 are a matter of design choice and may be varied to accommodate difference ranges of cable diameters depending upon the particular application.

Further, one skilled in the art will recognize that strain relief device 1 is not limited to the uses described herein, but may be used in applications pertaining to any field where there is a need to secure cables or other elongate members.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A strain relief device for securing a cable, comprising:
   a base;
   a tubular extension extending longitudinally from a first end of said base and having a plurality of arms, each of said plurality of arms having a free end and a movable pad articulably mounted to said free end; and
   a nut having an inner channel, said inner channel of said nut mountable over said tubular extension, and said inner channel having a tapered region, such that mounting said nut over said tubular extension forces said pads to constrict around a cable insertable within said tubular extension.

2. The device of claim 1, wherein said tubular extension has a threaded portion on an outer surface and said inner channel of said nut is at least partially threaded to matingly engage said threaded portion of said tubular extension.

3. The device of claim 1, wherein said pads are adjustable.

4. The device of claim 1, wherein said pads are pivotably mounted to said arms.

5. The device of claim 1, wherein said pads are at least partially formed with non-flat surfaces configured for enhanced frictional engagement with said cable.

6. The device of claim 1, wherein said base further comprises a mounting portion on a second end opposite said first end.

7. The device of claim 6, wherein said mounting portion is substantially cylindrical and has a threaded region.

8. The device of claim 1, further comprising a pivot for pivotably mounting each of said movable pads to a respective of said free ends.

9. The device of claim 8, wherein said pivot is a living hinge.

10. The device of claim 8, wherein said pivot is formed of a flexible material.

11. The device of claim 8, wherein each of the pivots are connected to a substantially central portion of a respective one of the movable pads.

12. The device of claim 1, wherein the movable pads have a taper substantially mirroring the taper of the arms.

13. The device of claim 1, wherein the movable pads pivot along a horizontal axis.

14. The device of claim 1, wherein a width of each of the movable pads is no wider than a width of a respective one of the arms.

15. The device of claim 1, further comprising a ball joint for articulably mounting the pad to the respective arm.

16. A junction box, comprising:
    a wall having an aperture;
    a strain relief device mounted to said wall and positioned in overlaying relationship to said aperture of said wall, said strain relief device having a base, a tubular extension extending longitudinally from a first end of said base and having a plurality of arms, each of said plurality of arms having a free end and a movable pad articulably mounted to said free end, and a nut having an inner channel, said inner channel of said nut mountable over said tubular extension, and said inner channel having a tapered region, such that mounting said nut over said tubular extension forces said pads to constrict around a cable insertable into said tubular extension.

17. A method for grippingly securing a cable, comprising the steps of:
    inserting a cable into a tubular portion of a body of a strain relief device, said tubular portion having a plurality of deflectable arms with movable pads articulably mounted to an end of said arms, said tubular portion compressible by a nut mountable over said tubular portion; and
    tightening said nut over said tubular portion, said nut having an inner channel with a tapered region that upon tightening forces said movably mounted pads of said deflectable arms to constrict around said cable.

* * * * *